March 11, 1930.                S. OSTROLENK                1,750,242
                            REMOTE METERING SYSTEM
                             Filed April 30, 1926
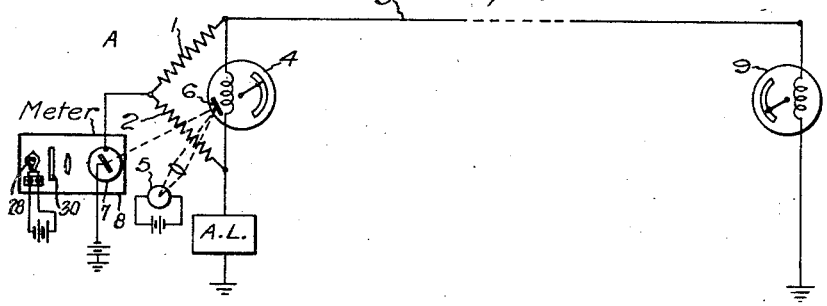
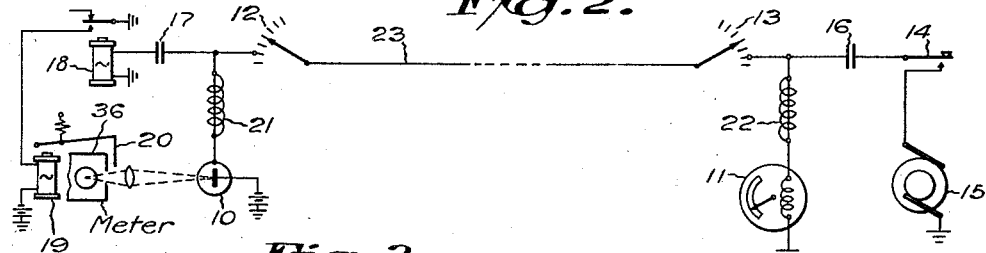
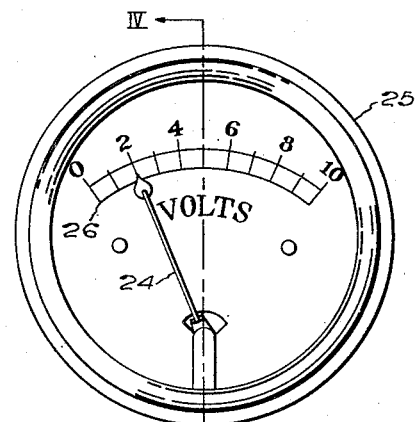
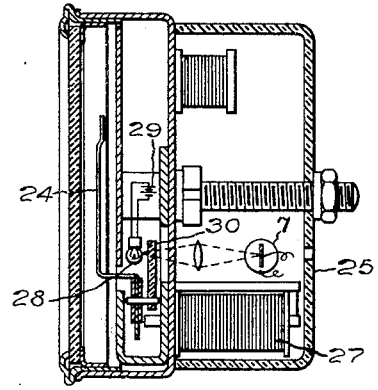
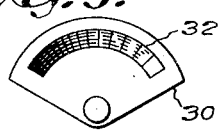
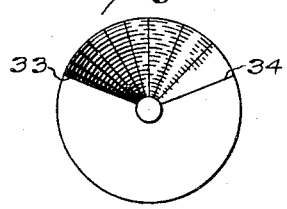
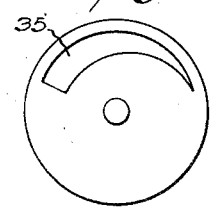
WITNESSES:                                          INVENTOR
                                                Samuel Ostrolenk.
                                                  BY
                                                          ATTORNEY Patented Mar. 11, 1930

1,750,242

UNITED STATES PATENT OFFICE

SAMUEL OSTROLENK, OF PITTSBURGH, PENNSYLVANIA, ASSIGNOR TO WESTINGHOUSE ELECTRIC & MANUFACTURING COMPANY, A CORPORATION OF PENNSYLVANIA

REMOTE-METERING SYSTEM

Application filed April 30, 1926. Serial No. 105,732.

My invention relates to signalling systems, and more particularly to that class employing remote metering.

An object of my invention is to provide means for indicating the position of a remotely disposed moving member.

Another object of my invention is to provide substantially inertialess means for translating the positions of a moving member into proportionate values of current.

Another object of my invention is to provide means including a photo-electric cell for remote metering.

Another object of my invention is to provide in a system of the above-indicated character means for compensating for variations in line resistance.

A further object of my invention is to provide means for faithfully re-producing meter indications at a remote point, irrespective of the changes in the transmission line resistance.

There are other objects of my invention which will appear hereinafter and together with the foregoing will be described in the following detailed specification.

Heretofore, means for remote metering have included moving members for translating the meter indication into electric currents. This involves a certain percentage of error, because of the inertia of the translating member. Furthermore, no satisfactory means has heretofore been provided for taking care of errors which arise due to the changes in line conditions, such as variations in the resistance of the circuit during the different seasons of the year.

In practicing my invention, I employ a photo-electric cell which is exposed to varying amounts of light in accordance with the position of a meter indicator. A galvanometer at a remote point is responsive to the variable amounts of current which the photo-electric cell transmits. A circuit connecting two stations forms one leg of a Wheatstone bridge and a galvanometer is connected across the apex to measure and compensate for resistance changes in this circuit.

Referring now to the drawings,

Figs. 1 and 2 are diagrams illustrating the circuit connections employed in my system, Fig. 3 is a front view of a meter embodying my invention, Fig. 4 is a sectional view taken along the line IV—IV of Fig. 3, Figs. 5, 6 and 7 are detail views of various modifications of the disc 30 in Fig. 4.

Referring now more particularly to Fig. 1, my invention comprises, in general, a metering station A and a remote office B at which point it is desired to produce the meter indications formed at A. A meter 8, similar in construction to that shown in Figs. 3 and 4, is so arranged, as will be described in more detail hereinafter, as to vary the amount of light on a photo-electric cell 7 in accordance with the position of its indicator.

The variable amount of light to which the photo-electric cell is exposed produces proportional currents in the conductor 3 to operate the galvanometer 9, the indicator of which thereupon assumes a position corresponding to that of the indicator of the meter 8.

The artificial lines marked A. L. are designed to so balance the resistance of the conductor 3 under normal conditions that normally the RI drop across the resistors 1 and 2 are equal and no current will flow in the galvanometer 4. The details of this theory are so commonly known in duplex telegraphy as to need no detailed explanation. When the resistance of the artificial line is made equal to that of the transmission circuit 3, it will be obvious that two parallel paths are provided for the current passing through the photo-electric cell 7. These paths are of equal resistance and the current, therefore, divides equally between them so that the voltage across the coil of the galvanometer 4 is zero. The galvanometer 9, however, is influenced by the current passing through the branch 1 of the resistance bridge and the circuit 3. This current divides between the galvanometer 9 and the bridge circuit at station B. It will thus appear that the galvanometer 9 is energized by the portion of the current passing through arm 1 of the bridge at station A and the transmission circuit 3, while the galvanometer 4 is entirely unaffected by this current as long as the artificial line is so adjusted as to balance the resistance of the transmission circuit exactly.

If, however, the resistance of the conductor 3 changes, the artificial lines will no longer balance the resistance of the main conductor, and currents from the photo-electric cell 7 will flow through the galvanometer 4 to turn its mirror 6.

Normally, no light is reflected from the light source 5 to the photo-electric cell 7. When, however, the galvanometer 4 turns its mirror 6, a proportionate amount of light will impinge upon the photo-electric cell and this can be predetermined so as to compensate for the change in line resistance. A window or other suitable aperture may be provided in the meter case to admit the light reflected from the mirror 6, and the light-controlling system may be so arranged that the area of the light-sensitive element illuminated depends upon the position of the mirror 6. Any other suitable means for controlling the amount of light falling on the cell 7 in proportion to the actuation of the galvanometer 4 may, of course, be employed.

In Fig. 2 this general system is slightly modified in that the compensation is accomplished manually instead of automatically. The selector mechanism 12 and 13 are stepped from contact to contact in a manner well known in supervisory control, for example, the patent to White 1,695,908, issued December 18, 1928, until the remote metering contact is reached, at which point remote metering is accomplished from ground through battery, photo-electric cell 10, impedance coil 21, selector switch 12, conductor 23, selector switch 13, impedance coil 22 and galvanometer 11, to ground, it being understood, of course, that the photo-electric cell 10 is controlled by the meter 36 in a manner to be described.

In order to determine whether the resistance of the line conductor has been changed, the dispatcher will so operate his key 14 as to energize the alternating current relay 18 from the source 15. Energization of the relay 18 will complete an obvious energizing circuit for the relay 19 which will thereupon operate a shutter device 20 to cut off the light effecting the photo-electric cell 10 and controlled by the meter 36. With no light impinging upon the photo-electric cell 10, the galvanometer needle should assume a predetermined position if no change in the line resistance has taken place. If the indicator is in any position other than normal, it can be manually adjusted to the correct position.

Referring now to Figs. 3, 4, 5, 6 and 7, the details of the invention will be described.

The indicator 24 of the meter 25 is actuated by the current traversing the electromagnet 27 which is connected in the circuit being measured. The meter is calibrated in the usual manner as shown at 26, to indicate volts in this case. Inclosed in the meter is the photo-electric cell 7 which is subjected to light from a lamp 28. The amount of this light is varied by a disc 30. Modified forms of this disc are shown in detail in Figs. 5, 6 and 7.

In Fig. 5 a slot 32 varies in its coefficient of transparency from a maximum at its extreme right to a minimum at its extreme left. The light source is opposite this disc whereby the position which the disc assumes determines the amount of light emitted from the lamp 28 which reaches the photo-electric cell 31. The disc, it should be understood, is fastened on the same shaft as the indicator 24, and will therefore turn with said indicator. In this manner, the position of the indicator determines the amount of light to which the cell is exposed.

In Fig. 6, the disc is divided into sectors 33 and 34, similarly arranged as described above to be of maximum transparency at the extreme right and gradually decreasing in transparency to the left. In Fig. 7, a slot 35 varies in width and in this manner varies the amount of light which can pass through.

Although I have described my invention as applied to remote metering, it is obvious that it has much broader application, such, for example, as for indicating at a remote point, the position of a moving member, or to register the position of any object.

I claim as my invention:

1. In a duplex signalling system, a network comprising a first leg, a second leg connected thereto, and an artificial line, an indicating device connected across said legs and to said artificial line, between normally equi-potential points of said legs, a meter device, including a photo-electric cell, connected to the junction of said legs, a signalling line connected to said indicating device and one leg, said artificial line having such value as to balance the normal resistance of said line, a source of light and means controlled by said indicating device for varying the amount of light from said source impinging on said photo-electric cell to vary the conductivity thereof for any meter reading, as said line resistance varies from normal.

2. In a duplex signalling system, a network comprising a first leg, a second leg connected thereto, and an artificial line, an indicating device connected across said legs and to said artificial line, between normally equi-potential points of said legs, a meter device, including a photo-electric cell, connected to the junction of said legs, a signalling line connected to said indicating device and one leg, said artificial line having such value as to balance the normal resistance of said line, a source of light and means controlled by said indicating device for varying the beam of light from said source impinging on said photo-electric cell to vary the conductivity thereof for any meter reading as said line resistance varies from normal, means for directing a second beam of light upon said photo-electric cell, means for varying the intensity of said beam in accordance with said meter reading and a receiving device connected to the signalling line for reproducing said meter readings.

3. In a signalling system, a network comprising a first leg, a second leg connected thereto, and an artificial line, a measuring device connected across said legs and to said artificial line between normally equi-potential points of said legs, a meter device connected to the junction of said legs, a signalling line connected to said measuring device and one leg of said network, said artificial line having such value as to balance the normal resistance of said signaling line and means controlled by said measuring device for increasing the resistance of said meter for any reading thereof as said signaling line resistance decreases from normal and for decreasing the resistance of said meter for any reading thereof as said line resistance increases from normal.

In testimony whereof, I have hereunto subscribed my name this 21st day of April, 1926.

SAMUEL OSTROLENK.